United States Patent
Ohashi et al.

(10) Patent No.: US 8,686,618 B2
(45) Date of Patent: Apr. 1, 2014

(54) VIBRATING DEVICE, AND DRIVE DEVICE, DUST REMOVING DEVICE, AND OPTICAL DEVICE WHICH INCLUDE THE VIBRATING DEVICE

(75) Inventors: Kaishi Ohashi, Tokyo (JP); Takayuki Tsukimoto, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 237 days.

(21) Appl. No.: 12/897,834

(22) Filed: Oct. 5, 2010

(65) Prior Publication Data

US 2011/0096397 A1    Apr. 28, 2011

(30) Foreign Application Priority Data

Oct. 26, 2009    (JP) .................... 2009-245908

(51) Int. Cl.
B06B 1/02 (2006.01)
B08B 7/02 (2006.01)
G02B 27/00 (2006.01)

(52) U.S. Cl.
CPC ............ B06B 1/0269 (2013.01); B08B 7/02 (2013.01); G02B 27/0006 (2013.01)
USPC .................................... 310/323.18

(58) Field of Classification Search
CPC ..... B06B 1/0269; B08B 7/02; G02B 27/0006
USPC ............... 310/314, 323.01–323.21, 328
See application file for complete search history.

(56) References Cited

U.S. PATENT DOCUMENTS

| | | | |
|---|---|---|---|
| 5,414,790 A | 5/1995 | Lee et al. | |
| 7,006,138 B2 | 2/2006 | Kawai | |
| 7,215,372 B2 | 5/2007 | Ito et al. | |
| 7,486,326 B2 | 2/2009 | Ito et al. | |
| 7,609,315 B2 | 10/2009 | Kawai | |
| 7,724,299 B2 | 5/2010 | Kawai | |
| 7,724,313 B2 | 5/2010 | Chen | |
| 2009/0109354 A1 | 4/2009 | Chen | |
| 2009/0206698 A1* | 8/2009 | Okazaki | 310/317 |
| 2009/0207493 A1 | 8/2009 | Ohashi | |
| 2011/0317264 A1* | 12/2011 | Matsumoto | 359/508 |

FOREIGN PATENT DOCUMENTS

| | | |
|---|---|---|
| CN | 1135261 A | 11/1996 |
| CN | 101196605 A | 6/2008 |
| CN | 101424798 A | 5/2009 |

OTHER PUBLICATIONS

Chinese Office Action dated Dec. 25, 2012, in related Chinese Patent Application No. 201010519929.7 (with English translations).

* cited by examiner

*Primary Examiner* — Derek Rosenau
(74) *Attorney, Agent, or Firm* — Fitzpatrick, Cella, Harper & Scinto

(57) ABSTRACT

A vibrating device includes a vibrator having multiple electromechanical energy converting elements, with the vibrating device generating a first standing wave and a second standing wave in the vibrator with a predetermined time phase difference. The first standing wave and the second standing wave having multiple nodal lines aligned in the same direction and being different in terms of an order. A first electromechanical energy converting element is disposed at a first portion, and a second electromechanical energy converting element is disposed at a second portion. The first portion extends in a first direction parallel to one of the multiple nodal lines, and the second portion extends in a second direction which crosses the first direction.

39 Claims, 11 Drawing Sheets

VIBRATING DEVICE, AND DRIVE DEVICE, DUST REMOVING DEVICE, AND OPTICAL DEVICE WHICH INCLUDE THE VIBRATING DEVICE

BACKGROUND OF THE INVENTION

1. Field of the Invention

The present invention relates to a vibrating device, and more particularly, to a vibrating device for moving an object by vibration, that is, a vibrating device for use in a dust removing device of an optical device, such as a camera, a facsimile machine, a scanner, a projector, a copying machine, a laser beam printer, an ink jet printer, a lens, binoculars, or an image display apparatus.

2. Description of the Related Art

In recent years, an image pickup device has been improved in resolution of an optical sensor. Along with the improvement, an image taken by the image pickup device has become more seriously affected by dust that adheres to an optical system during use.

In particular, the resolution of an image pickup element of a video camera or a still camera is remarkably improving. Accordingly, if dust adheres to an optical element disposed close to the image pickup element, a defect may be caused in the image.

For example, if dust from outside or abrasion powder generated on an internal mechanical sliding friction surface adheres to an infrared cut filter or an optical low-pass filter, the dust comes out in the taken image all the more for the small amount of blurring of the image on a surface of the image pickup element.

On the other hand, an image pickup portion of a copying machine, a facsimile machine, or a scanner reads a planar document by scanning a line sensor or by scanning the original brought proximity to the line sensor. In this case, if dust adheres to a light beam incident portion with respect to the line sensor, the dust comes out in the scanned image.

In particular, in case of a device employing a system of scanning an original, such as a reading portion of a facsimile machine, or in a case of a so-called flow reading type, in which an original from an automatic original transporting device of a copying machine is read while being transported, one particle of dust comes out as a line image continued in an original transporting direction.

As a result, there arises a problem that image quality is greatly impaired.

The image quality may be restored when the dust is wiped out by manpower. However, dust that adheres during use may only be identified after image taking An image taken or scanned before the dust is identified has the dust coming out in the image, which needs to be corrected by software. Further, in a case of a copying machine, the image with the dust is simultaneously output to a medium such as a sheet of paper, which requires considerable efforts for correction.

In view of the above-mentioned problems, there has been conventionally proposed an image reading device in which dust is moved away from an image reading portion through application of a vibration (U.S. Pat. No. 7,006,138, and U.S. Patent Application No. 2009/207493).

FIG. 8A illustrates a configuration of a conventional dust-proof element portion disclosed in U.S. Pat. No. 7,006,138.

The dust-proof element portion includes a glass plate 27 serving as an optical element. A light beam passes through an imaging light beam transmissive range 27a inside the glass plate 27, and forms an image on an image pickup element (not shown).

Further, piezoelectric bodies 271, 272, 273, and 274 are fixed to the glass plate 27.

An electric terminal 275 for grounding is provided between each piezoelectric body and the glass plate 27.

Each piezoelectric body includes, in the direction of the length, sections which are alternately changed in direction of polarity (as indicated by "+" and "−" in FIG. 8A). The piezoelectric body 271 and the piezoelectric body 273 have the same polarity arrangement in the direction of the length.

Further, the piezoelectric body 272 and the piezoelectric body 274 have the same polarity arrangement in the direction of the length. When the section length of "+" and "−" is defined as $\lambda$, the polarity arrangements of the piezoelectric body 272 and the piezoelectric body 274 are each displaced by $\lambda/4$ in the direction of the length, with respect to the polarity arrangements of the piezoelectric body 271 and the piezoelectric body 273.

The piezoelectric body 271 and the piezoelectric body 273 are each applied with a voltage in the same temporal phase in the same period by an oscillator.

On the other hand, the piezoelectric body 272 and the piezoelectric body 274 are applied with a voltage shifted in temporal phase from that of the piezoelectric body 271 and the piezoelectric body 273 by a 90 degree phase shifter, in the same period by an oscillator.

FIG. 8B illustrates a traveling wave generated on a surface of the glass plate 27, which is viewed from an h direction of FIG. 8A described above.

The traveling wave travels to the right in FIG. 8B (direction of an arrow i). When the traveling wave is generated on the surface of the glass plate 27, elliptic motion in a counterclockwise direction on a plane of paper of FIG. 8B occurs at any mass point on the surface of the glass plate 27.

Accordingly, dust adhering to the surface of the glass plate 27 moves to the left in FIG. 8B, so as to be removed from the imaging light beam transmissive region 27a.

FIG. 9A illustrates a configuration of a vibrating device of a conventional dust removing device disclosed in U.S. Patent Application No. 2009/207493.

A vibrating device 300 is provided to an image pickup element 301 which converts a received object image into an electric signal so as to generate image data.

A space in a surface (front surface) of the image pickup element 301 is hermetically sealed by the vibrating device 300 and the image pickup element 301.

The vibrating device 300 includes an optical element 302 and a pair of piezoelectric elements 303a and 303b. The optical element 302 is in the form of a rectangular plate shape. The piezoelectric elements 303a and 303b are fixed to both end portions of the optical element 302 through bonding, and each serve as an electromechanical energy converting element.

The piezoelectric element 303a is applied with an alternating voltage A, and the piezoelectric element 303b is applied with an alternating voltage B.

FIG. 9B illustrates a displacement distribution of an out-of-plane first order bending vibration A and a displacement distribution of an out-of-plane second order bending vibration B.

The longitudinal axis represents a displacement in an out-of-plane direction of a surface of the vibrating device 300, the surface being opposite to the side on which the image pickup element 301 is disposed, in which the image pickup element 301 side is defined as a negative side. As illustrated FIG. 9B, the lateral axis corresponds in position to the vibrating device 300 in the direction of the length.

The alternating voltage A and the alternating voltage B are both alternating voltages with periodicity responsive to a resonance phenomenon which occurs with the out-of-plane first order bending vibration and the out-of-plane second order bending vibration. Further, the alternating voltage A and the alternating voltage B are different from each other in temporal phase.

Accordingly, in the vibrating device 300, a combined vibration of two vibrations, namely, the out-of-plane first order bending vibration and the out-of-plane second order bending vibration which are different in temporal phase, is excited.

FIGS. 10, 11, 12, and 13 are graphs showing, for each temporal phase, displacements of the out-of-plane first order bending vibration and the out-of-plane second order bending vibration in a case where those two vibrations have a time phase difference of 90 degrees and an amplitude ratio therebetween is 1 to 1, and a displacement of a vibrator in which those vibrations are combined.

In FIGS. 10, 11, 12, and 13, a waveform C shows a displacement of the out-of-plane first order bending vibration. A waveform D shows a displacement of the out-of-plane second order bending vibration.

A waveform E shows a displacement of the vibrating device 300 in which those two vibrations are combined.

A waveform G shows a displacement of the vibrating device 300, which precedes the waveform E by 30 degrees in temporal phase.

A waveform F shows a normalized displacement rate in a Y direction in the vibrating device 300. In a case where the dust removing device is operated, dust that has adhered to a surface of the optical element 302 is applied with a force in the direction of the normal of the surface of the optical element 302 when the optical element 302 raises up the dust out of plane (in a direction (positive direction) opposite to the side on which the image pickup element 301 of FIG. 9B is disposed), and moves in a flipping manner. In other words, in each temporal phase, when the waveform F showing the displacement rate in the Y direction takes a positive value, dust is raised up out of plane and applied with a force in the direction of the normal of the waveform E showing the displacement of the vibrating device 300 in the corresponding temporal phase. Then, the dust is once detached from the original position of adhesion to be relocated to a position (moved position) different from the original position of adhesion even if the dust adheres again to the optical element. In this manner, the dust keeps moving by repeatedly being detached and relocated in a manner as described above.

An arrow h of FIGS. 10 to 13 indicates a moving direction of dust.

Referring to FIGS. 10 to 13, in a range between a position 60 and a position 300 of the optical element 302, an amount of vibration for moving dust in a positive direction of an X direction is significantly larger than an amount of vibration for moving dust in a negative direction of the X direction in one period of the vibration.

Accordingly, dust may be moved in the positive direction of the X direction.

When an effective portion of the optical element 302 with respect to the image pickup element 301 falls within the range between the position 60 and the position 300, dust may be removed from the effective portion.

However, the above-mentioned vibrating devices have problems as follows. In the vibrating device disclosed in U.S. Pat. No. 7,006,138, the end portions of the glass plate 27 interfere with the traveling direction of the traveling wave. The traveling wave is reflected by the end portions, with the result that an incident wave and a reflected wave overlap each other, which may form a standing wave which does not travel.

The standing wave does not generate the elliptic motion, which makes it difficult to move dust in only one direction.

Alternatively, if a method of eliminating the reflected wave is employed, a resonance phenomenon may be difficult to make use of, because the phenomenon occurs only when the incident wave and the reflected wave overlap each other.

As a result, a large amplitude may not be obtained, and hence the elliptic motion is also reduced in speed. Accordingly, dust is moved at a lower speed, which impairs efficiency.

Meanwhile, in the vibrating device disclosed in U.S. Patent Application No. 2009/207493, a large response amplitude is obtained due to the resonance phenomenon. However, the vibrating device 300 has many resonant modes, and hence unnecessary vibrations, other than the two desired vibrations, may also be generated.

When the unnecessary vibrations are generated, if the unnecessary vibration increases to a certain value or more, an in-plane direction of a force of raising up an object on the surface of the optical element 302 out of plane may become opposite in some areas of the surface, or the force may have a smaller number of components in the in-plane direction. In some areas, the in-plane moving directions may become opposite to each other, leading to a situation where dust cannot be moved or the force moving dust becomes smaller than the adherent force of the dust, with the result that the efficiency of moving dust is reduced.

SUMMARY OF THE INVENTION

The present invention has been made in view of the above-mentioned problems, and therefore, it is an object of the invention to provide a vibrating device, and a drive device, a dust removing device, and an optical device which include the vibrating device, which are capable of efficiently moving an object including dust in a predetermined direction by a vibration.

The present invention provides a vibrating device, and a drive device, a dust removing device, and an optical device which include the vibrating device, which are configured as follows.

A vibrating device according to the present invention, includes; a vibrator including multiple electromechanical energy converting elements, a power supply for applying an alternating voltage to the multiple electromechanical energy converting elements, and a control circuit for controlling the alternating voltage to be applied by the power supply, the vibrating device generating, by the control circuit, a first standing wave and a second standing wave in the vibrator with a predetermined time phase difference, the first standing wave and the second standing wave having multiple nodal lines aligned in the same direction and being different in terms of an order, in which the vibrator includes at least one of the multiple electromechanical energy converting elements, which is disposed in the same direction as the multiple nodal lines, and also includes at least another one of the multiple electromechanical energy converting elements, which is disposed in a direction in which the multiple nodal lines are aligned.

Further, a drive device of the present invention has a feature of including the above-mentioned vibrating device.

Further, a dust removing device of the present invention has a feature of including the above-mentioned vibrating device.

Further, an optical device of the present invention has a feature of including the above-mentioned vibrating device.

According to the present invention, a vibrating device, and a drive device, a dust removing device, and an optical device which include the vibrating device, which are capable of efficiently moving an object including dust in a predetermined direction by a vibration may be obtained.

Further features of the present invention will become apparent from the following description of exemplary embodiments with reference to the attached drawings.

DESCRIPTION OF THE EMBODIMENTS

In the following, embodiments of the present invention are described.

(First Embodiment)

Figure 1:
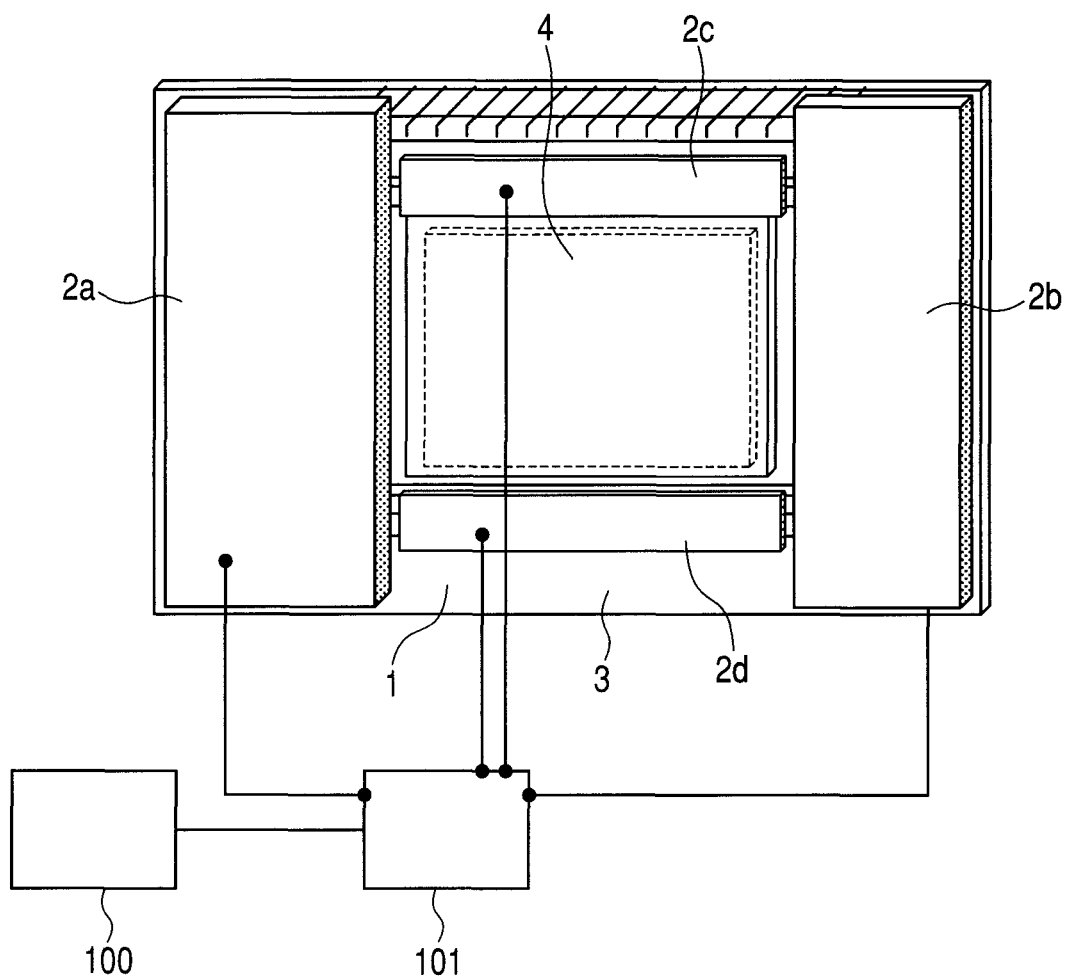
FIG. 1 is a perspective view of a vibrating device according to a first embodiment of the present invention.

With reference to FIG. 1, a configuration example of a vibrating device installed in a camera, according to a first embodiment, is described.

The vibrating device according to the first embodiment functions as a dust removing device for moving dust for removal.

FIG. 1 illustrates an optical element 1, four piezoelectric elements 2a, 2b, 2c, 2d serving as electromechanical energy converting elements, and an image pickup element 4. The piezoelectric elements are fixed to the optical element 1 through bonding, on the same side as the image pickup element 4.

Two of the piezoelectric elements 2a, 2b are elongated in a vertical direction, and disposed on both end portions of the optical element 1 in a horizontal direction.

Other two of the piezoelectric elements 2c, 2d are elongated in the horizontal direction, and disposed inwardly with respect to both end portions of the optical element 1 in the vertical direction.

A control circuit 100 sets a frequency, a voltage value, and a temporal phase of an alternating voltage to be generated by a power supply 101.

The power supply 101 is electrically connected to the piezoelectric elements 2a, 2b, 2c, and 2d.

The optical element 1 and the piezoelectric elements form a vibrator 3.

The vibrator 3 is attached to the image pickup element 4 which serves as a light-receiving element so that a space in a surface of the image pickup element 4 is hermetically sealed.

Light from a subject passes through the optical element 1, and enters the image pickup element 4. A range that allows the light to enter the image pickup element 4 at this time after passing through the optical element 1 is defined as an optical active area 5.

Even in the first embodiment, similarly to U.S. Patent Application No. 2009/207493, two out-of-plane bending vibrations, which are different from each other in terms of the order of vibration and have nodal lines aligned in the same direction, are excited with a time phase difference.

For this reason, in the first embodiment, the control circuit 100 sets a frequency of an alternating voltage to be generated by the power supply 101 to a frequency that shows a response to both an out-of-plane tenth order bending vibration (first standing wave) and an out-of-plane eleventh order bending vibration (second standing wave) which are different from each other in terms of the order of vibration and have nodal lines aligned in a horizontal direction on a plane of paper.

Here, the above-mentioned nodal line according to the present invention is formed as follows. That is, when a vibration is applied to a predetermined surface of an object to be vibrated (for example, optical element) so that a standing wave is generated on the surface of the object to be vibrated, a line connecting nodes of the standing wave is referred to as nodal line. Further, when the nodal lines are aligned in the same direction, the direction corresponds to a direction in which the nodal lines are aligned (direction orthogonal to the nodal lines) in a case there are aligned multiple nodal lines.

Further, the control circuit 100 sets temporal phases for four alternating voltages to be generated by the power supply 101.

As a result, the out-of-plane tenth order bending vibration (first standing wave) and the out-of-plane eleventh order bending vibration (second standing wave) are generated in the vibrator 3 in a different temporal phase.

Those vibrations are combined into a vibration which is directed in the same in-plane direction across the almost entire region of the surface of the optical element 1 when raising up an object in an out-of-plane direction.

As a result, all the objects including dust to be moved by the vibration may be applied with a force in only one in-plane direction, to thereby attain unidirectional movement.

Here, the above-mentioned problems inherent in the related art (U.S. Patent Application No. 2009/207493) are described further in detail.

Figure 2:
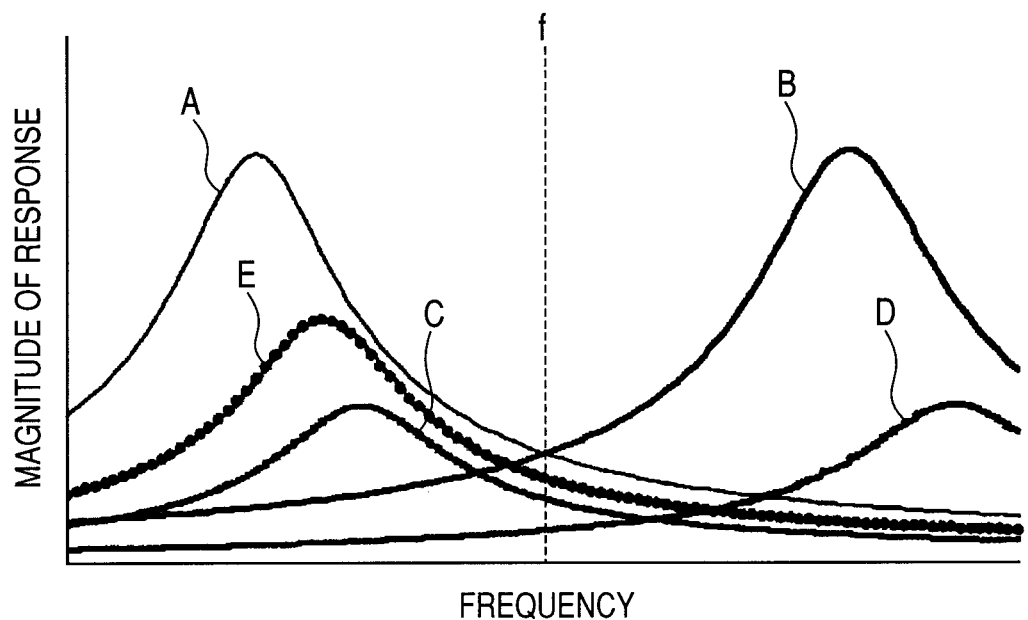
FIG. 2 is a graph showing a relation between a frequency of an excitation force and a magnitude of vibration response in a conventional vibrating device.

FIG. 2 is a graph showing a relation between a frequency of an excitation force and a magnitude of response of each vibration in a case where the piezoelectric elements 2a, 2b, 2c and 2d are provided only on both end portions in the horizontal direction as in the related art (U.S. Patent Application No. 2009/207493).

The two vibrations A and B, which have nodal lines aligned in the horizontal direction and are different from each other in terms of the order of vibration, contribute to the unidirectional movement of an object. Of the two vibrations, the vibration A is lower in resonance frequency than the vibration B.

In FIG. 2, a vibration C, a vibration D, and a vibration E are illustrated as other unnecessary vibrations.

The unnecessary vibration C is the same as the vibration A in terms of the order of bending vibration in the horizontal direction, and simultaneously causes a first order bending deformation in the vertical direction. The vibration C is substantially the same as the vibration A in wavelength, and has a resonance frequency close to the resonance frequency of the vibration A.

When the vibration C is large, the displacement distribution becomes nonuniform in the vertical direction, leading to a situation where dust cannot be moved in some areas or the force moving dust may be reduced in some areas, with the result that the efficiency of moving dust is reduced.

Similarly, the unnecessary vibration D is the same as the vibration B in terms of the order of bending vibration in the horizontal direction, and simultaneously causes a first order deformation in the vertical direction.

The vibration D is substantially the same as the vibration B in wavelength, and has a resonance frequency close to the resonance frequency of the vibration B.

When the vibration D is large, the displacement distribution becomes nonuniform in the vertical direction, leading to a situation where dust cannot be moved in some areas or the force moving dust may be reduced in some areas, with the result that the efficiency of moving dust is reduced.

When a frequency f of FIG. 2, which allows a large response to be obtained from the vibration A and the vibration B, is used as a drive frequency, the unnecessary vibrations C and D become close to each other in resonance frequency and drive frequency, and hence the responses thereof are also increased.

As a result, the unnecessary vibration C or the unnecessary vibration D is likely to hinder the unidirectional movement of the object.

An unnecessary vibration E is different from the vibration A or from the vibration B in terms of the order of bending vibration in the horizontal direction, and hence the vibration E generates a bending deformation in the vertical direction. If the unnecessary vibration E is large in response, the displacement distribution in the horizontal direction of the combined vibration is disordered, and hence an in-plane direction of a force of raising up out of plane an object on the surface of the optical element 1 may become opposite in some areas of the surface, leading to a situation where dust cannot be moved unidirectionally in some areas. As a result, the dust may not be moved in some areas or the force moving dust may be reduced in some areas, with the result that the efficiency of moving dust is reduced.

Figure 3:
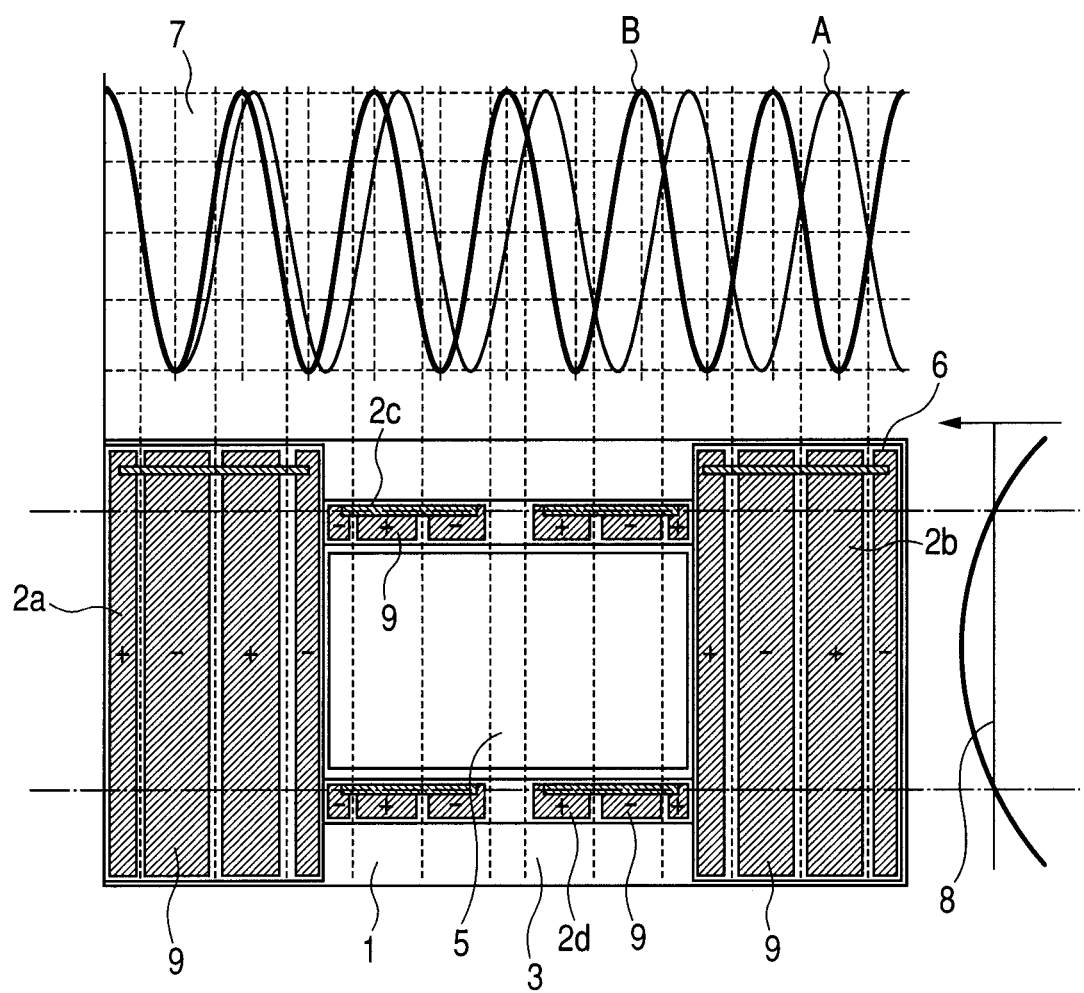
FIG. 3 illustrates displacement distributions of an out-of-plane tenth order bending vibration and an out-of-plane eleventh order bending vibration in a vibrator, and an arrangement of piezoelectric elements.

Next, with reference to FIG. 3, a vibration displacement of the vibrator 3 and the correspondence between the arrangement of the piezoelectric elements 2 and an electrode pattern according to the first embodiment are described.

Further, effects to be produced on the above-mentioned problems inherent in the related art (U.S. Patent Application No. 2009/207493) are also described.

A plot 7 shows a displacement distribution (denoted by A in FIG. 3) of the out-of-plane tenth order bending vibration and a displacement distribution (denoted by B in FIG. 3) of the out-of-plane eleventh order bending vibration, which are excited in the vibrator 3 and have nodal lines aligned in the horizontal direction.

The longitudinal axis represents a displacement of the optical element 1 in an out-of-plane direction, and a positive side falls on a side opposite to a side on which the image pickup element 4 is disposed.

The lateral axis corresponds to a position of the optical element 1 in the horizontal direction in FIG. 3.

Further, in the first embodiment, a neutral plane of those two bending vibrations falls inside the optical element 1.

The piezoelectric element disposed in a positive portion of the displacement is subjected to elastic deformation in the horizontal direction, while the piezoelectric element disposed in a negative portion of the displacement is subjected to elastic deformation in the horizontal direction in an opposite temporal phase (shifted by 180 degrees).

Those two vibrations are excited with a time phase difference, to thereby move dust in only one direction, similarly to the related art (U.S. Patent Application No. 2009/207493), so that the dust may be removed from the optical effective potion 5.

Further, a plot 8 shows a displacement distribution in the vertical direction of a vibration in which a bending deformation in the horizontal direction and a first order bending deformation in the vertical direction simultaneously occur.

The longitudinal axis corresponds to the position of the optical element 1 in the vertical direction in FIG. 3. The lateral axis represents a displacement of the optical element 1 in an out-of-plane direction, and a positive side falls on the side opposite to the side on which the image pickup element 4 is disposed.

When the vibration is large, the displacement distribution becomes nonuniform in the vertical direction, leading to a situation where dust cannot be moved in some areas or the force moving dust may be reduced in some areas, with the result that the efficiency of moving dust is reduced.

The piezoelectric elements 2a and 2b on both ends in the horizontal direction are each in the form of a rectangular plate, which are disposed across both ends of the optical element 1 in the vertical direction while disposed from each end of the optical element 1 to the optical active area 5 in the horizontal direction.

The piezoelectric elements 2a and 2b each include an electrode uniformly formed across an entire rear surface through which the piezoelectric elements 2a and 2b are coupled to the optical element 1. The piezoelectric elements 2a and 2b each include, on a front surface on the opposite side, an electrode divided into multiple segments (hereinafter, referred to as segmented electrode 9).

The segmented electrode 9 is divided at intermediate positions between a point of node where the displacement distribution of the out-of-plane tenth order bending vibration becomes substantially zero and a point of node where the displacement distribution of the out-of-plane eleventh order bending vibration becomes substantially zero, the correspondence therebetween being illustrated by the dashed lines of FIG. 3. Here, the case where the displacement distribution is substantially zero includes a case where the displacement distribution has no displacement, and also a case where the displacement distribution may have displacement which is small enough that an influence to be exerted on the vibration state of the vibrator by the displacement may be ignored.

During polarization, the electrode on the rear surface is set to a ground potential, while the segments of the segmented electrode 9 on the front surface are applied with potentials which are different in polarity between segments next to each other, as illustrated by "+" and "−" in FIG. 3. The segments of the segmented electrode 9 of the piezoelectric element 2a on the left are polarized as "+−+−" from the left, while the segments of the segmented electrode 9 of the piezoelectric element 2b on the right are polarized as "−+−+" from the right.

After polarization, due to a conductive coating material 6 with conductivity which is applied across the segmented electrode 9, all the segments of the segmented electrode 9 become the same potential when any one of the segments of the segmented electrode 9 is applied with a voltage.

The piezoelectric element 2 has a property of expanding when polarized to the same potential as the potential during polarization and contracting when polarized to a potential that is different from the potential during polarization.

When applied with an alternating voltage, a periodic expansion and contraction force is generated along with the cycles of the alternating voltage.

Further, when applying the alternating voltage, a temporal phase (0 degree or 180 degrees) of the expansion and contraction force with respect to the alternating voltage is determined according to the polarity during polarization.

The piezoelectric element 2a on the left is applied with an alternating voltage of $V1=A1 \times COS(2\pi ft)$, where A1 represents a voltage amplitude value, f represents a frequency, and t represents time.

The piezoelectric element 2b on the right is applied with an alternating voltage of $V2=A2 \times COS(2\pi ft+\phi)$, where A2 represents a voltage amplitude value. The alternating voltage of V2 is different in temporal phase by $\phi$ from the alternating voltage of V1.

At this time, a component V (difference) of a difference between the alternating voltages V1 and V2, which is obtained as V (difference)=V1−V2, mainly contributes to the out-of-plane tenth order bending deformation, which is a bending deformation in which the piezoelectric elements 2a and 2b are in opposite temporal phase.

On the other hand, a component V (sum) of the sum of the alternating voltages V1 and V2, which is obtained as V (sum) =V1+V2, mainly contributes to the out-of-plane eleventh order bending deformation, which is a bending deformation in which the piezoelectric elements 2a and 2b are in the same temporal phase.

Here, the temporal phase of the expansion and contraction force generated in the piezoelectric element 2 due to the component V (difference) is described, with reference to the component V (difference) as the temporal phase.

The distribution of temporal phases of the expansion and contraction force to be generated in the piezoelectric element 2a on the left is 0°, 180°, 0°, 180° from the left, as corresponding to the segmented electrode 9. In the piezoelectric element 2b on the right, the distribution of temporal phases becomes 180°, 0°, 180°, 0° from the right.

The temporal phase distribution of the expansion and contraction force substantially coincides with the distribution of the temporal phase of the expansion and contraction deformation of the piezoelectric element 2 according to the displacement distribution of the out-of-plane tenth order bending vibration (denoted by A in FIG. 3).

Accordingly, a large response of the out-of-plane tenth order bending vibration may be obtained.

On the other hand, the temporal phase distribution of the expansion and contraction deformation of the piezoelectric element 2 according to the displacement distribution of the out-of-plane eleventh order bending vibration (denoted by B in FIG. 3) is inversed between the piezoelectric element 2a on the left and the piezoelectric element 2b on the right. In the out-of-plane eleventh order bending vibration generated by the component V (difference), a vibration excited by the piezoelectric element 2a on the left and a vibration excited by the piezoelectric element 2b on the right are equal in amount and have opposite temporal phase, and hence cancel out each other. Accordingly, the out-of-plane eleventh order bending vibration generates no response.

Further, with respect to the unnecessary vibration which is different from the out-of-plane tenth order bending vibration in terms of the number of nodes in the horizontal direction, the temporal phase distribution of the expansion and contraction force is different from the temporal phase distribution of deformation, and hence an effect that the vibrations cancel out each other may be obtained, and hence the response of the unnecessary vibration may be reduced.

Next, the temporal phase of the expansion and contraction force generated in the piezoelectric element 2 due to the component V (sum) is described, with reference to the component V (sum) as the temporal phase.

The distribution of temporal phases of the expansion and contraction force to be generated in the piezoelectric element 2a on the left is 0°, 180°, 0°, 180° from the left, as corresponding to the segmented electrode 9.

In the piezoelectric element 2b on the right, the distribution of temporal phases is 0°, 180°, 0°, 180° from the right.

The temporal phase distribution of the expansion and contraction force substantially coincides with the temporal phase distribution of the expansion and contraction deformation of the piezoelectric element 2 according to the displacement distribution of the out-of-plane eleventh order bending vibration (denoted by B in FIG. 3). Accordingly, a large response of the out-of-plane eleventh order bending vibration may be obtained.

In the out-of-plane tenth order bending vibration generated by the expansion and contraction force of the component V (sum), a vibration excited by the piezoelectric element 2a on the left and a vibration excited by the piezoelectric element 2b on the right are equal in amount and have opposite temporal phase, and hence cancel out each other. Accordingly, the out-of-plane tenth order bending vibration generates no response.

Further, with respect to the unnecessary vibration which is different from the out-of-plane eleventh order bending vibration in terms of the number of nodes in the horizontal direction, the distribution of temporal phase of the expansion and contraction force is different from the temporal phase distribution of deformation, and hence an effect that the vibrations cancel out each other may be obtained. Accordingly, the response of the unnecessary vibration may be reduced.

The first embodiment further includes the piezoelectric elements 2c and 2d, which are disposed in a direction in which the nodal lines of the out-of-plane tenth order bending vibration and the out-of-plane eleventh order bending vibration are aligned.

The piezoelectric element 2c is disposed on an upper side of the optical effective potion 5, and the piezoelectric element 2d is disposed on a lower side of the optical active area 5.

Further, the piezoelectric elements 2c and 2d are disposed so as to be in positions in the vertical direction to come across the nodes of the vibration displacement distribution (see 8 of FIG. 3) in which the bending deformation in the horizontal direction and the first order bending deformation in the vertical direction simultaneously occur.

The piezoelectric elements 2c and 2d each include, similarly to the piezoelectric elements 2a and 2b, an electrode uniformly formed across an entire rear surface through which the piezoelectric elements 2c and 2d are coupled to the optical element 1.

Further, the piezoelectric elements 2c and 2d each include, on a front surface on the opposite side, the segmented electrode 9 divided into multiple segments at points corresponding to intermediate positions between a point of node where the displacement distribution of the out-of-plane tenth order bending vibration becomes substantially zero and a point of node where the displacement distribution of the out-of-plane eleventh order bending vibration becomes substantially zero.

During polarization, the electrode on the rear surface, through which the piezoelectric elements 2c and 2d are coupled to the optical element 1, is set to a ground potential, while the segments of the segmented electrode 9 are applied with potentials which are different in polarity between segments next to each other.

In both of the piezoelectric elements 2c and 2d, the segments of the segmented electrode 9 are polarized as "−+−+−+" from the left, and the polarities continue from the sequence of polarities of the piezoelectric elements 2a and 2b. No electrode is disposed in the center where the sequence of polarities from the piezoelectric element 2a and the sequence of polarities from the piezoelectric element 2b are contradictory to each other.

Further, after polarization, due to the conductive coating material 6 with conductivity connecting the right half and the left half of the segmented electrode 9 in FIG. 3, all the segments of the segmented electrode 9 become the same potential when any one of the segments of the segmented electrode 9 is applied with a voltage.

During operation, an alternating voltage, which has the same temporal phase as V1 to be applied to the piezoelectric element 2a described above, is applied to both the left side of the piezoelectric element 2c and the left side of the piezoelectric element 2d in FIG. 3, while an alternating voltage, which has the same temporal phase as V2 to be applied to the piezoelectric element 2b described above, is applied to both the right side of the piezoelectric element 2c and the right side of the piezoelectric element 2d in FIG. 3.

In this manner, with respect to the out-of-plane tenth order bending vibration and the out-of-plane eleventh order bending vibration, a vibration excited by the piezoelectric elements 2a and 2b and a vibration excited by the piezoelectric elements 2c and 2d may be excited in the same temporal phase. When those vibrations are combined, the out-of-plane tenth order bending vibration and the out-of-plane eleventh order bending vibration may generate a further large response.

Meanwhile, in view of the unnecessary vibration which causes a bending deformation in the horizontal direction and the first order bending deformation in the vertical direction to occur simultaneously, the piezoelectric elements 2c and 2d are disposed so as to be in positions to come across the nodes of the displacement distribution in the vertical direction (illustrated in the plot 8 of FIG. 3), which includes a region where the temporal phase of the expansion and contraction deformation is inversed.

On the other hand, the piezoelectric elements 2c and 2d in the vertical direction of the segmented electrode 9 are in the same polarity during polarization and at the same potential during operation, and hence the temporal phase distribution of the expansion and contraction force and the temporal phase distribution of deformation are different from each other. Accordingly, there is no increase in an excitation force to the unnecessary vibration which causes a bending deformation in the horizontal direction and the first order bending deformation in the vertical direction to occur simultaneously, and hence a response of the unnecessary vibration may be relatively reduced.

As described above, according to the first embodiment, in the vibrating device for moving an object unidirectionally by using two vibrations which are different from each other in terms of the order of bending vibration in the horizontal direction and have a time phase difference provided therebetween, the piezoelectric elements 2 (2a, 2b) are disposed in a direction in which the nodal lines extend, and the piezoelectric elements 2 (2c, 2d) are also disposed in a direction in which the nodal lines are aligned.

With this configuration, a vibration contributing to the movement of the object may be increased in response, to thereby produce an effect of increasing efficiency of moving the object.

Further, the increased response of the vibration contributing to the movement of the object may lead to a relative decrease in response of the unnecessary vibration which hinders the movement of the object. Even in this regard, the first embodiment may produce an effect of increasing efficiency of moving the object.

Further, the piezoelectric elements 2c and 2d are disposed so as to be in positions in the vertical direction to come across the nodes of the displacement distribution in the vertical direction, in which the bending deformation in the horizontal direction and the first order bending deformation in the vertical direction simultaneously occur, and hence there may be produced an effect of further reducing relatively the response of the unnecessary vibration which hinders the movement of the object.

(Second Embodiment)

Figure 4:
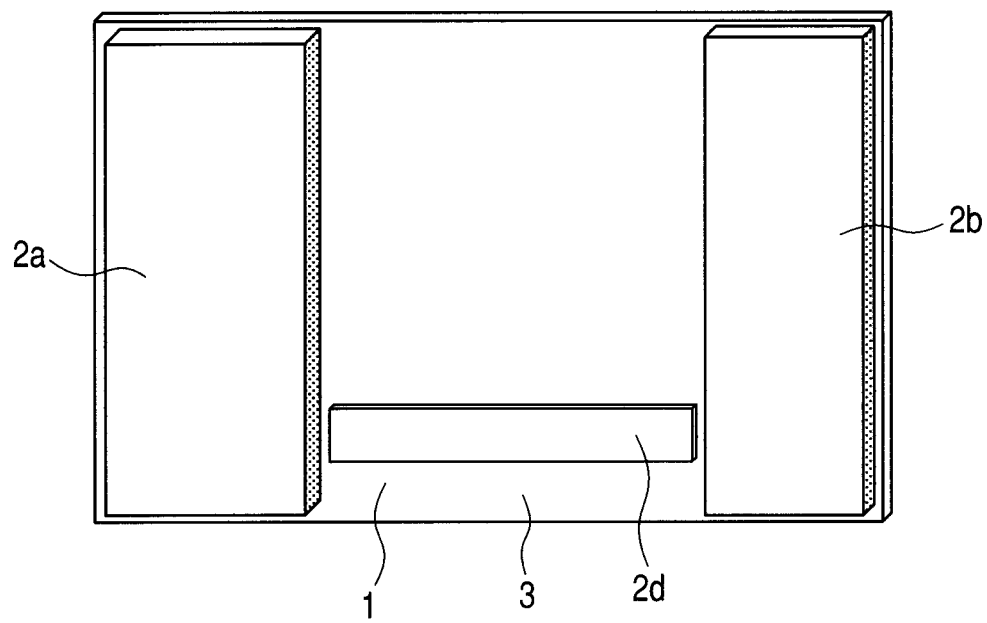
FIG. 4 is a perspective view of a vibrating device according to a second embodiment of the present invention.

With reference to FIG. 4, a configuration example of a vibrating device according to a second embodiment of the present invention is described. The second embodiment is different from the first embodiment in that the piezoelectric elements disposed in the vertical direction in the first embodiment are reduced to only one piezoelectric element 2d in the second embodiment.

The rest of the configuration of the second embodiment is similar to that of the first embodiment. Even in the second embodiment, similarly to the first embodiment, the out-of-plane tenth order bending vibration and the out-of-plane eleventh order bending vibration, which have nodal lines in the horizontal direction and contribute to the movement of an object, may be increased in response.

Further, the unnecessary vibration may be reduced in response. As a result, the object may be moved efficiently.

The second embodiment may be reduced in manufacturing cost because the number of constituent elements is reduced by one as compared to the first embodiment. Further, the second embodiment is reduced in footprint.

(Third Embodiment)

Figure 5:
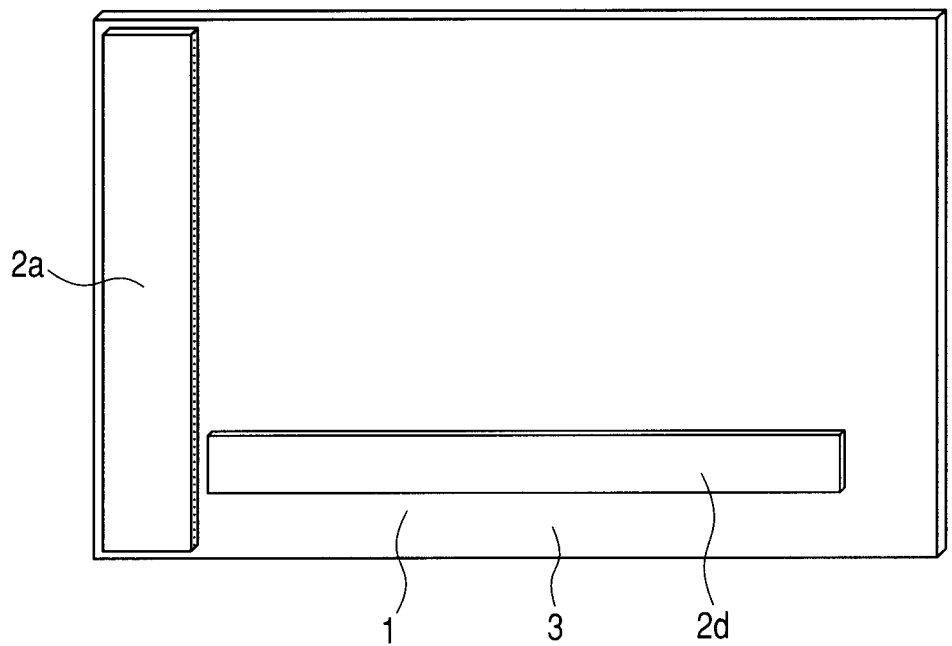
FIG. 5 is a perspective view of a vibrating device according to a third embodiment of the present invention.

With reference to FIG. 5, a configuration example of a vibrating device according to a third embodiment of the present invention is described. Differences between the third embodiment and the second embodiment are described.

The piezoelectric elements disposed in the horizontal direction in the second embodiment are reduced to only one piezoelectric element 2a in the third embodiment. The piezoelectric element 2a is formed to extend in the horizontal direction to a position of a first node from the end of the out-of-plane eleventh order bending vibration, and has an electrode uniformly formed on a front surface thereof.

The piezoelectric element 2d is formed so that one end portion thereof extends in the horizontal direction to the proximity to the end portion of the piezoelectric element 2a.

Further, the piezoelectric element 2d has a symmetric shape with respect to the center of the optical element 1. The rest of the configuration is similar to that of the second embodiment.

The temporal phase distributions of the expansion and contraction forces to be generated by the piezoelectric elements 2a and 2d substantially coincide with the temporal phase distribution of the deformation caused by the out-of-plane tenth order bending vibration or the out-of-plane eleventh order bending vibration.

Even in the third embodiment, similarly to the first and second embodiments, the out-of-plane tenth order bending vibration and the out-of-plane eleventh order bending vibration, which have nodal lines in the horizontal direction and contribute to the movement of an object, may be increased in response.

Further, the unnecessary vibration may be reduced in response. As a result, the object may be moved efficiently.

The third embodiment may be reduced in manufacturing cost because the number of constituent elements is reduced by one as compared to the second embodiment. Further, the third embodiment is reduced in footprint.

(Fourth Embodiment)

Figure 6:
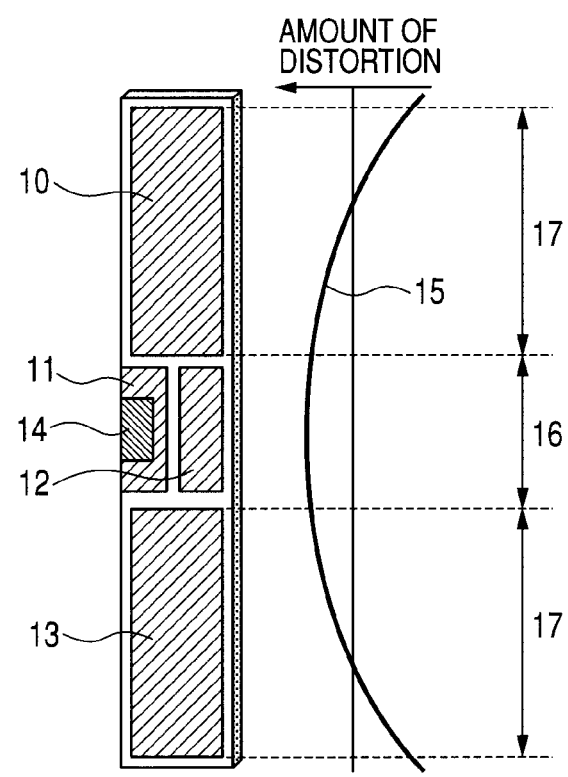
FIG. 6 illustrates an arrangement of electrodes in a piezoelectric element according to a fourth embodiment of the present invention.

With reference to FIG. 6, a configuration example of a vibrating device according to a fourth embodiment of the present invention is described.

FIG. 6 illustrates an arrangement of electrodes in the piezoelectric element 2a according to the fourth embodiment.

The vibrating device according to the fourth embodiment has a configuration in which the arrangement of electrodes in the piezoelectric element 2a is different from that of the third embodiment.

The piezoelectric element 2a has an electrode uniformly formed on a rear surface through which the piezoelectric element 2a is coupled to the optical element 1, similarly to the third embodiment.

Electrode on the front surface of the piezoelectric element 2a is divided into four electrodes of an upper electrode 10, a ground electrode 11, an electrode for sensing vibration 12, and a lower electrode 13. The electrode is divided in a direction orthogonal to the nodal lines of the out-of-plane tenth order bending vibration and the out-of-plane eleventh order bending vibration which contribute to the movement of the object.

An ion plating film 14 containing gold is formed through ion plating so as to be disposed across the ground electrode 11 and the electrode on the rear surface of the piezoelectric element 2a.

With this configuration, the electrode on the rear surface and the ground electrode 11 are electrically connected to each other.

During polarization, a direct electric field is applied between the ground electrode 11 and the upper electrode 10, the electrode for sensing vibration 12, and the lower electrode 13 in the same direction, so that the electrodes may be polarized in the same direction. During operation, a power supply (not shown) for generating an alternating voltage is electrically connected to the ground electrode 11, the upper electrode 10, and the lower electrode 13.

During operation, an alternating electric field acts on portions corresponding to the upper electrode 10 and to the lower electrode 13 so that an expansion and contraction force is generated in the piezoelectric element 2a, to thereby excite the out-of-plane tenth order bending vibration and the out-of-plane eleventh order bending vibration.

The electrode for sensing vibration 12 is connected to a control circuit (not shown). During operation, an alternating potential is generated between the electrode for sensing vibration 12 and the ground electrode 11 due to a piezoelectric effect.

The alternating potential may be calculated by the control circuit, to thereby detect the vibration state (such as a magnitude of response and a temporal phase) of the vibrating device.

FIG. 6 illustrates the distribution of distortion 15 which is generated in the piezoelectric element 2a in response to vibrations (unnecessary vibrations C and D) in which the out-of-plane bending deformation in the horizontal direction and the first order bending deformation in the vertical direction simultaneously occur.

The longitudinal axis represents a position in the vertical direction, and the lateral axis represents an amount of distortion. The upper electrode 10 is disposed in a range where a spatial integral of the amount of the distortion becomes substantially zero. An excitation force to be generated by the piezoelectric element in order to excite a certain vibration is proportional to a spatial integral of a product of an amount of distortion to be caused by the vibration in the piezoelectric element, an electric field value, and the plus and minus of the direction of polarization.

With respect to the unnecessary vibrations C and D, the spatial integral of an amount of distortion in a position where the upper electrode 10 is disposed is substantially zero, while the electric field value is constant and the plus and minus of the direction of polarization is uniform.

In this case, a spatial integral of a product of an amount of distortion in the piezoelectric element, an electric field value, and the plus and minus of the direction of polarization becomes substantially zero, and hence an excitation force for generating the unnecessary vibrations C and D is substantially zero in a position where the upper electrode 10 is disposed.

The lower electrode 13 is also disposed in a range where the spatial integral of the amount of distortion caused by the unnecessary vibrations C and D becomes substantially zero.

Similarly, the excitation force for generating the unnecessary vibrations C and D is substantially zero in a portion where the lower electrode 13 is disposed.

With this configuration, the excitation force for generating the unnecessary vibrations C and D is substantially zero, and hence a magnitude of the response of the unnecessary vibrations C and D may be reduced to extremely small magnitude.

It should be noted that, in the fourth embodiment, the center position in the vertical direction of a portion (non-drive area 16), which does not act on the driving of the piezoelectric element 2a, is made to coincide with the center position in the vertical direction of the piezoelectric element 2a. Effects to be produced through this configuration are described.

The amount of distortion of the piezoelectric element 2a corresponding to the out-of-plane tenth order bending vibration or the out-of-plane eleventh order bending vibration, which contributes to the movement of an object, is substantially constant in the vertical direction. The excitation force for generating the out-of-plane tenth order bending vibration or the out-of-plane eleventh order bending vibration is substantially proportional to the area of the drive range 17 excluding the area of the non-drive area 16. The area of the non-drive area 16 is preferred to be smaller in order to obtain a larger amount of the excitation force for generating the out-of-plane tenth order bending vibration or the out-of-plane eleventh order bending vibration.

Accordingly, in order to further reduce influence of the unnecessary vibrations C and D on the out-of-plane tenth order bending vibration and the out-of-plane eleventh order bending vibration, the non-drive area 16 may be further reduced in area, so that a spatial integral of the amount of distortion in the piezoelectric element 2a may be reduced to substantially zero, which is preferred.

The amount of distortion in the piezoelectric element 2a corresponding to the unnecessary vibrations C and D is shown by the line 15 of FIG. 6, which has a positive range in the center and negative ranges at both ends in the vertical direction, provided that the left side on the plane of paper is positive.

The integral of the positive region is larger than the integrals of the negative regions. Accordingly, the non-drive area 16 is preferred to be provided to a part of the center, which is the positive region, without being provided to either one of the end portions in the vertical direction, which are the negative regions, of the amount of distortion. If the non-drive areas 16 are provided to both the positive region and the negative region, as another example different from the above, non-drive areas in the positive region and in the negative regions all need to be increased in order to reduce the spatial integral of the amount of distortion in the drive range 17 to substantially zero, with the result that the non-drive area 16, which is a combined area of the non-drive areas in the positive region and in the negative regions, is also increased.

Further, the amount of distortion in the piezoelectric element 2a has a maximum positive value at the center in the vertical direction, which reduces with the distance from the center. In view of this, in order to further reduce the non-drive area 16 in area while reducing the spatial integral of the amount of distortion in the drive range 17 to substantially zero, it is further preferred that the center position of the non-drive area 16 in the vertical direction be made coincide with the center position of the piezoelectric element 2a in the vertical direction.

As described above, in the fourth embodiment, the center position in the vertical direction of a portion (non-drive area 16) which does not act on the driving of the piezoelectric element 2a is made coincide with the center position of the piezoelectric element 2a in the vertical direction, to thereby further reduce influence of the unnecessary vibrations C and D on the out-of-plane tenth order bending vibration and the out-of-plane eleventh order bending vibration.

Alternatively, another configuration may be employed for the fourth embodiment, in which the drive range 17 may be changed in direction of polarization in part, or may be changed in electric field value or polarity, to thereby similarly reduce an excitation force with respect to the unnecessary vibrations C and D.

Figure 7:
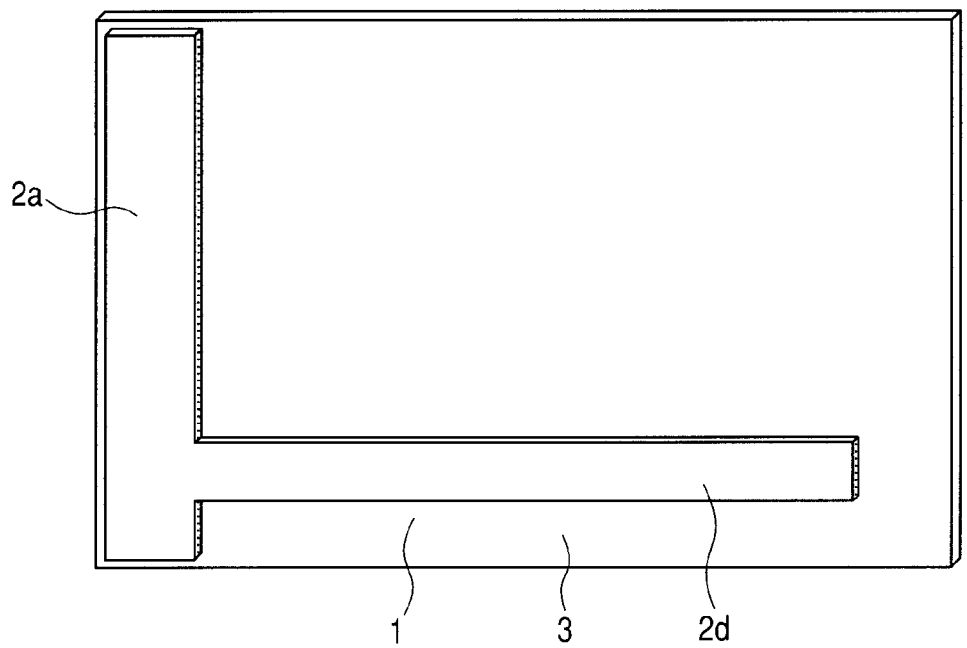
FIG. 7 is a perspective view of a vibrating device according to another embodiment of the present invention.
Figure 8A:
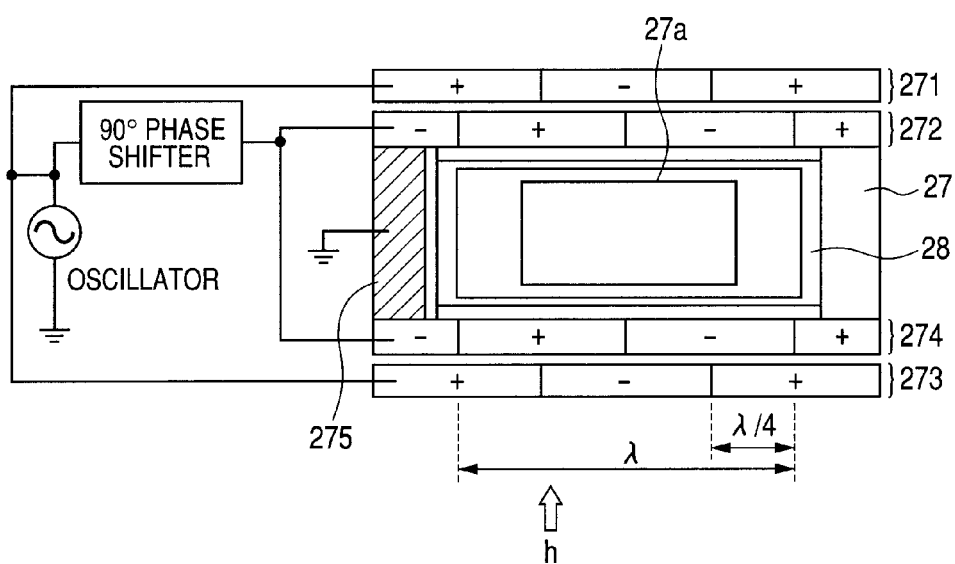
FIG. 8A illustrates a configuration of a conventional vibrating device.
Figure 8B:
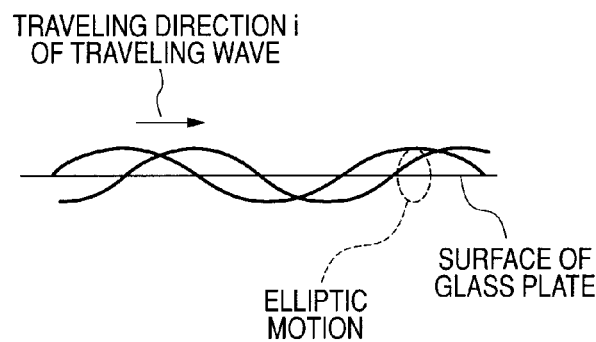
FIG. 8B illustrates a traveling wave generated on a surface of a glass plate which is viewed from an h direction of FIG. 8A.
Figure 9A:
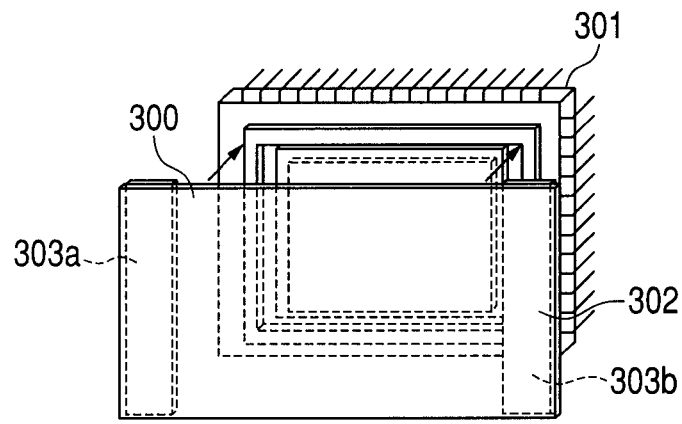
FIG. 9A illustrates a configuration of a conventional vibrating device.
Figure 9B:
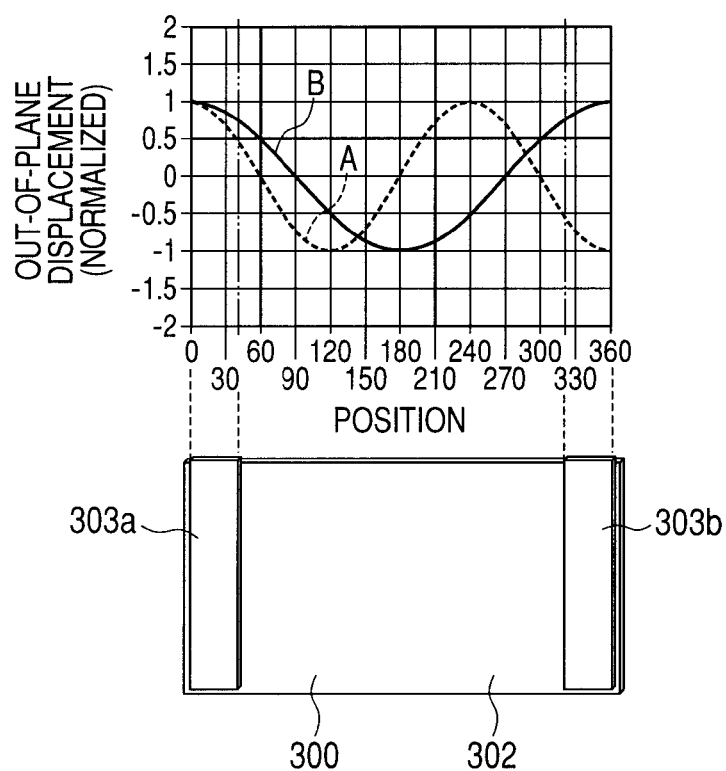
FIG. 9B illustrates a displacement distribution of an out-of-plane first order bending vibration and a displacement distribution of an out-of-plane second order bending vibration B in a vibrator of a conventional vibrating device, and an arrangement of piezoelectric elements.
Figure 10:
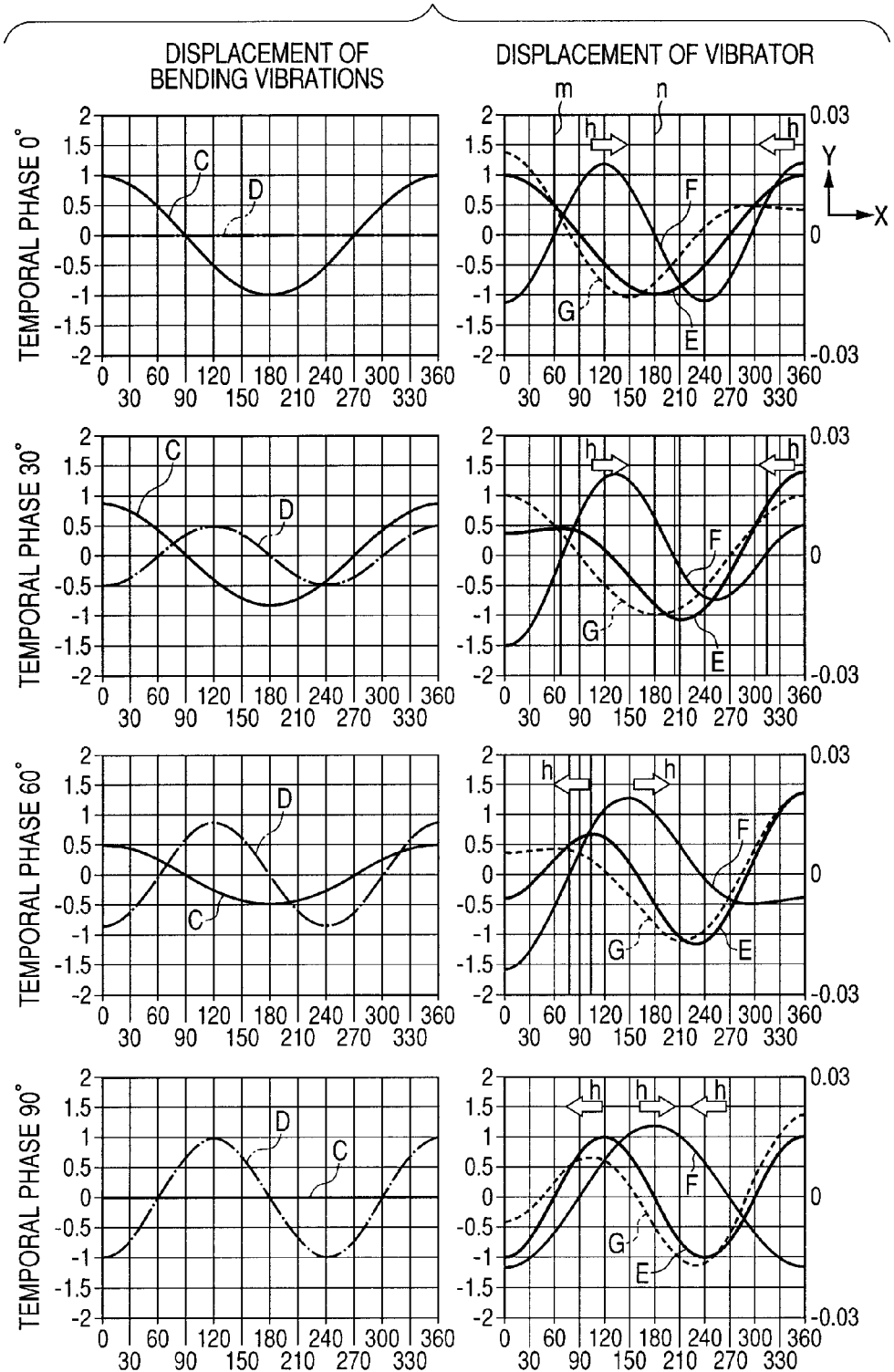
FIG. 10 shows graphs of, for each temporal phase, displacements of an out-of-plane first order bending vibration and an out-of-plane second order bending vibration in a case where those two vibrations have a temporal phase difference of 90 degrees, and a displacement of the vibrator in which those vibrations are combined, in the conventional vibrating device.
Figure 11:
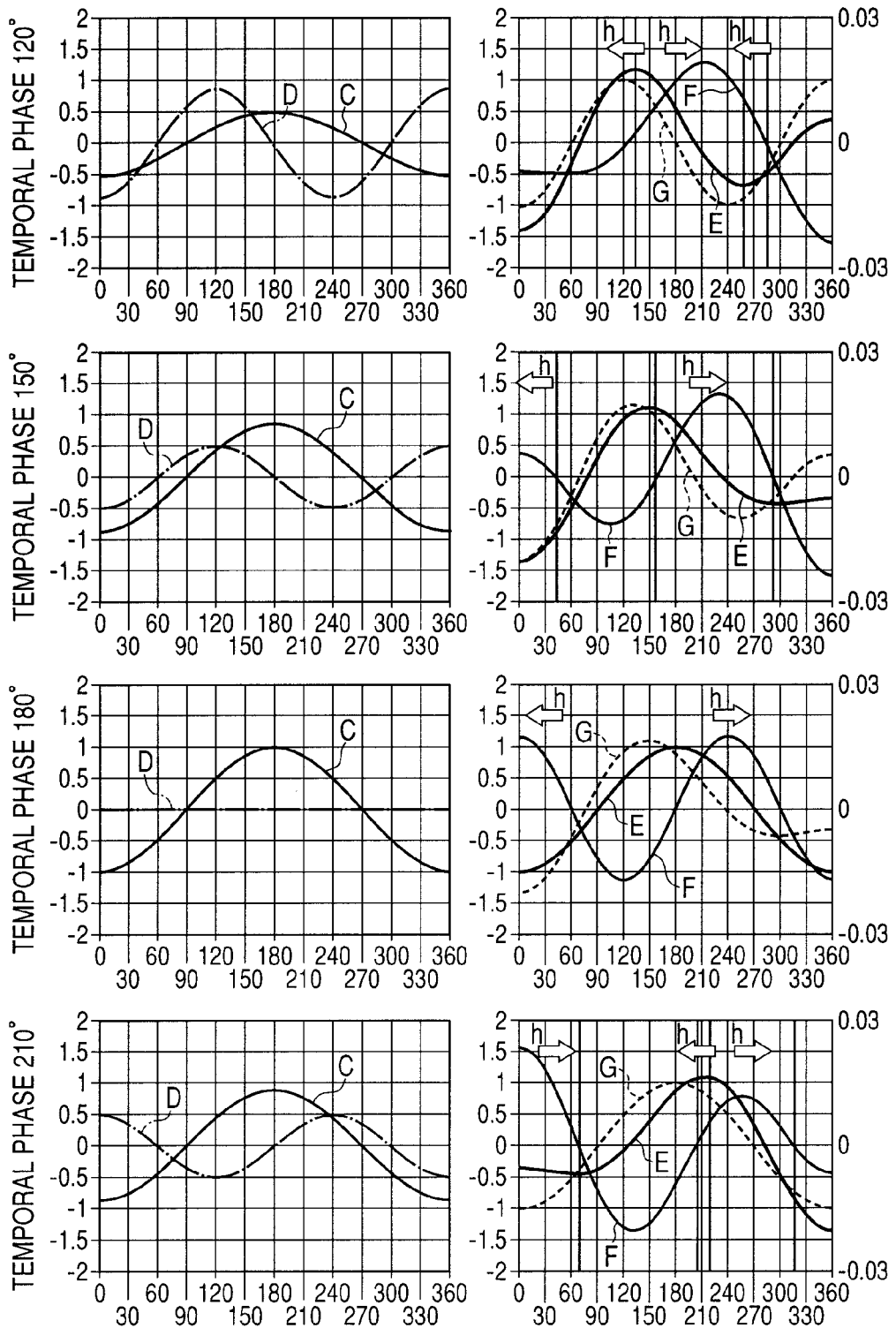
FIG. 11 shows graphs of, for each temporal phase, displacements of the out-of-plane first order bending vibration and the out-of-plane second order bending vibration in the case where those two vibrations have the time phase difference of 90 degrees, and a displacement of the vibrator in which those vibrations are combined, in the conventional vibrating device.
Figure 12:
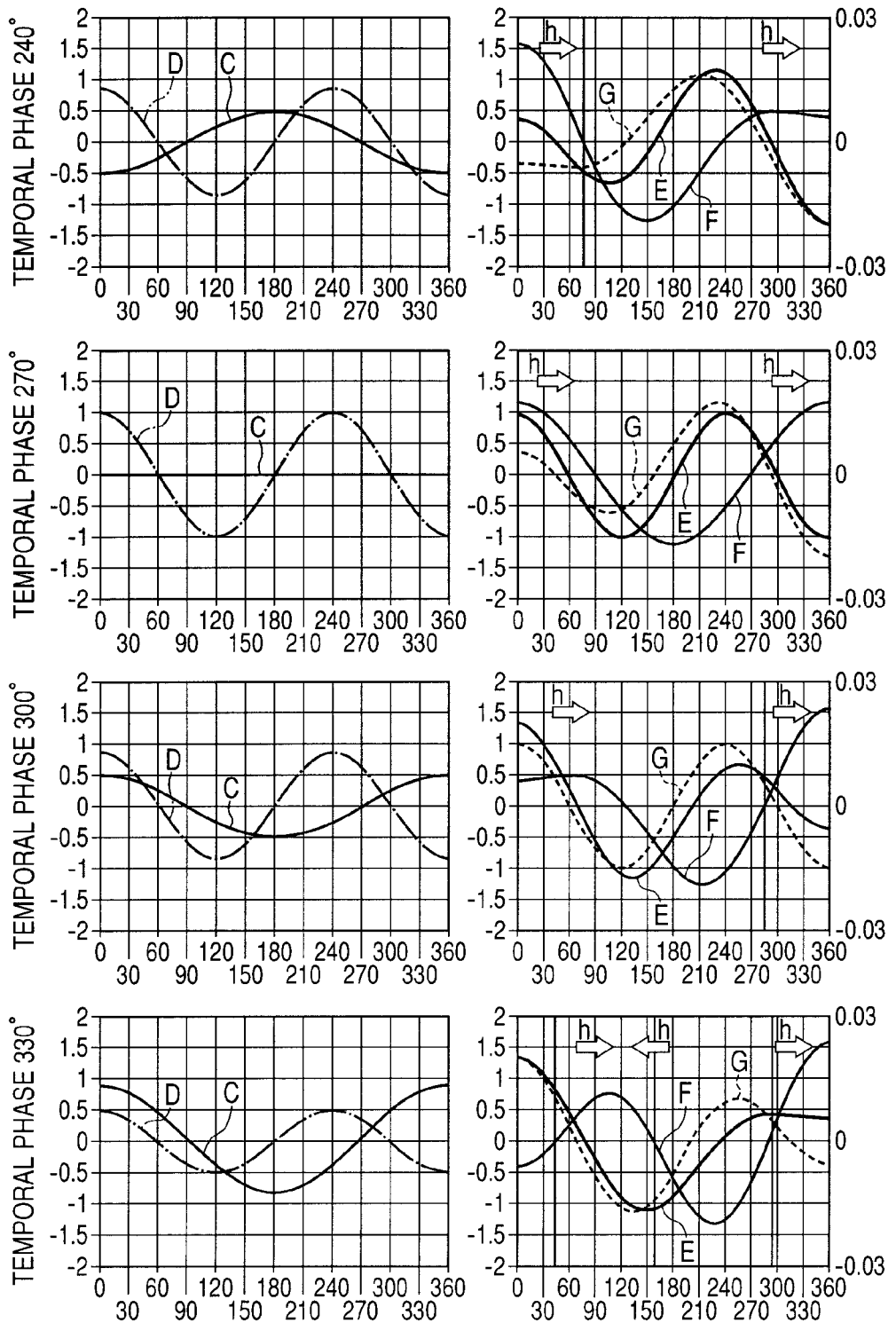
FIG. 12 shows graphs of, for each temporal phase, displacements of the out-of-plane first order bending vibration and the out-of-plane second order bending vibration in the case where those two vibrations have the time phase difference of 90 degrees, and a displacement of the vibrator in which those vibrations are combined, in the conventional vibrating device.
Figure 13:
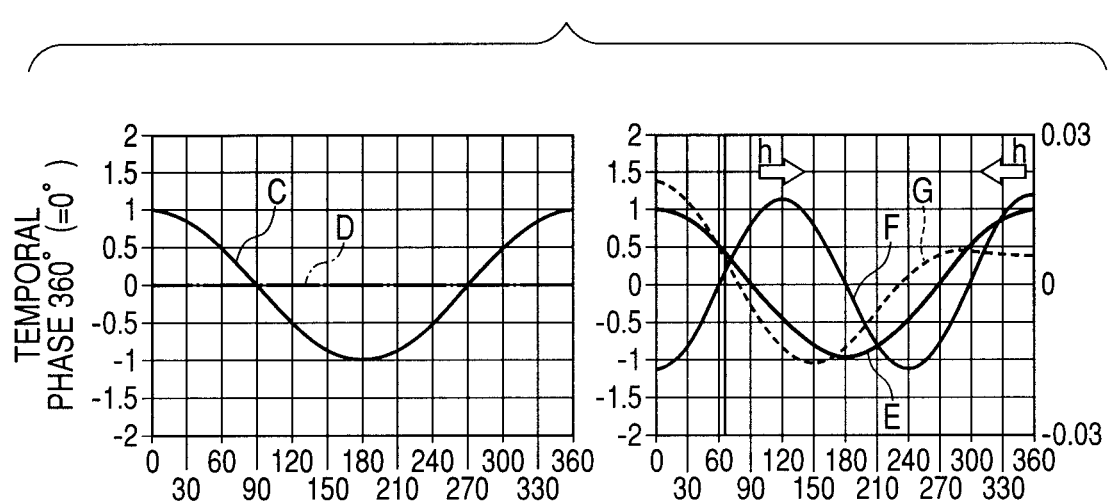
FIG. 13 shows graphs of, for each temporal phase, displacements of the out-of-plane first order bending vibration and the out-of-plane second order bending vibration in the case where those two vibrations have the time phase difference of 90 degrees, and a displacement of the vibrator in which those vibrations are combined, in the conventional vibrating device.

Still alternatively, as illustrated in FIG. 7, the piezoelectric elements 2a and 2d may be integrally formed.

Still alternatively, the segmented electrode 9 divided in a direction orthogonal to the nodal lines may be provided, similarly to the fourth embodiment, to the vibrating device according to the first and second embodiments in which two piezoelectric elements 2a and 2b are disposed in the direction in which the nodal lines extend, to thereby reduce the excitation force with respect to the unnecessary vibrations C and D.

The vibrating device described with reference to the above-mentioned embodiments may be applied to a drive device, to thereby form a drive device capable of driving an object in a predetermined direction.

Further, the vibrating device may be applied to a dust removing device, to thereby form a dust removing device capable of removing dust by moving the dust in a predetermined direction.

Further, the above-mentioned dust removing device may be employed to form an optical device capable of removing dust on an optical path.

Specifically, for example, the vibrating device may be applied to an optical device, such as a camera, a facsimile machine, a scanner, a projector, a copying machine, a laser beam printer, an ink jet printer, a lens, binoculars, or an image display apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-245908, filed on Oct. 26, 2009, which is hereby incorporated by reference herein in its entirety.

What is claimed is:
1. A vibrating device, comprising:
   a vibrator including:
      a first electromechanical energy converting element disposed at a first portion of the vibrator; and
      a second electromechanical energy converting element disposed at a second portion of the vibrator,
   wherein the vibrating device is configured to generate a vibration in the vibrator, the vibration comprising a component of a first standing wave and a component of a second standing wave simultaneously with a predetermined time phase difference, and the first standing wave and the second standing wave having multiple nodal lines aligned in the same direction and being different in terms of an order,
   wherein the first portion extends in a first direction parallel to one of the multiple nodal lines,
   wherein the second portion extends in a second direction which crosses the first direction,
   wherein a length of the first portion in the first direction is greater than a length of the first portion in the second direction, and
   wherein a length of the second portion in the second direction is greater than a length of the second portion in the first direction.

2. The vibrating device according to claim 1, wherein the second electromechanical energy converting element includes an electrode divided into multi-divided electrodes.

3. The vibrating device according to claim 1, wherein the first electromechanical energy converting element includes an electrode divided in the second direction.

4. The vibrating device according to claim 1, further comprising
a circuit which supplies an alternating voltage to the multiple electromechanical energy converting elements.

5. A drive device comprising the vibrating device according to claim 1, wherein the drive device drives an object in a predetermined direction by using the vibrating device.

6. A dust removing device comprising the vibrating device according to claim 1, wherein the dust removing device moves dust in a predetermined direction by using the vibrating device.

7. An optical device comprising the dust removing device according to claim 6, wherein the optical device removes dust on an optical path by using the dust removing device.

8. The vibrating device according to claim 1, wherein the first electromechanical energy converting element extends in the first direction.

9. The vibrating device according to claim 1, wherein the second electromechanical energy converting element extends in the second direction.

10. The vibrating device according to claim 1, wherein an electrode of the first electromechanical energy converting element is divided only at the position substantially corresponding to one of a first position of one of the multiple nodal lines of one of the first standing wave and the second standing wave and a second position between adjacent nodal lines of the multiple nodal lines of the first standing wave and the second standing wave.

11. The vibrating device according to claim 2,
wherein a distance between an edge of a selected one of the multiple divided electrodes and an adjacent nodal line of the multiple nodal lines of the first standing wave and the second standing wave is smaller than a distance between a center of the selected divided electrode and the adjacent nodal line among the multiple nodal lines of the first standing wave and the second standing wave, in the second direction, and
wherein the adjacent nodal line is a nodal line which is a nearest nodal line to the center of the selected divided electrode among the multiple nodal lines.

12. The vibrating device according to claim 2, wherein the multiple divided electrodes are divided at a position substantially corresponding to one of a first position of one of the multiple nodal lines of one of the first standing wave and the second standing wave and a second position which is a substantive intermediate position between adjacent nodal lines of the multiple nodal lines of the first standing wave and the second standing wave.

13. The vibrating device according to claim 1, wherein the circuit sets a frequency of the alternating voltage to a frequency that shows a response to both the first standing wave and the second standing wave.

14. The vibrating device according to claim 1, wherein the vibration is a traveling wave.

15. The vibrating device according to claim 1, wherein the second electromechanical energy converting element is disposed at a position of a nodal line of a vibration, with the position being different from the multiple nodal lines of the first standing wave and the second standing wave.

16. A vibrating device comprising:
a vibrator including a first electromechanical energy converting element and a second electromechanical energy converting element,
wherein the vibrating device is configured to generate a vibration in the vibrator, the vibration comprising a component of a first standing wave and a component of a second standing wave simultaneously with a predetermined time phase difference, the first standing wave and the second standing wave being different in terms of an order and having multiple nodal lines which extend in a first direction and are aligned along a second direction,
wherein the second direction crosses the first direction,
wherein the first electromechanical energy converting element includes an electrode divided into multiple divided electrodes in the second direction,
wherein a distance between an edge of a selected one of the multiple divided electrodes and an adjacent nodal line of the multiple nodal lines of the first standing wave and the second standing wave is smaller than a distance between a center of the selected divided electrode and the adjacent nodal line among the multiple nodal lines of the first standing wave and the second standing wave, in the second direction, and
wherein the adjacent nodal line is a nodal line which is a nearest nodal line to the center of the selected divided electrode among the multiple nodal lines.

17. The vibrating device according to claim 16, wherein the second electromechanical energy converting element includes an electrode divided at a position substantially corresponding to one of a first position of one of the multiple nodal lines of one of the first standing wave and the second standing wave and a second position between adjacent nodal lines of the multiple nodal lines of the first standing wave and the second standing wave.

18. The vibrating device according to claim 16, wherein at least one of the multiple divided electrodes of the first electromechanical energy converting element is divided in the first direction.

19. The vibrating device according to claim 17, further comprising
a circuit which supplies an alternating voltage to the multiple electromechanical energy converting elements.

20. A drive device comprising the vibrating device according to claim 16, wherein the drive device drives an object in a predetermined direction by using the vibrating device.

21. A dust removing device comprising the vibrating device according to claim 16, wherein the dust removing device moves dust in a predetermined direction by using the vibrating device.

22. An optical device comprising the dust removing device according to claim 21, wherein the optical device removes dust on an optical path by using the dust removing device.

23. The vibrating device according to claim 16, wherein the first electromechanical energy converting element extends in the first direction.

24. The vibrating device according to claim 17, wherein the second electromechanical energy converting element extends in the second direction.

25. The vibrating device according to claim 16,
wherein the multiple divided electrodes are divided at a position substantially corresponding to one of a first position of one of the multiple nodal lines of one of the first standing wave and the second standing wave and a second position which is a substantive intermediate position between adjacent nodal lines of the multiple nodal lines of the first standing wave and the second standing wave.

26. The vibrating device according to claim 16, wherein the circuit sets a frequency of the alternating voltage to a frequency that shows a response to both the first standing wave and the second standing wave.

27. The vibrating device according to claim 16, wherein the vibration is a traveling wave.

28. The vibrating device according to claim 16, wherein the second electromechanical energy converting element is disposed at a position of a nodal line of a vibration, with the position being different from the multiple nodal lines of the first standing wave and the second standing wave.

29. A vibrating device comprising:
a first electromechanical energy converting element, the first electromechanical energy converting element comprising a first electrode and a second electrode,
wherein the vibrating device is configured to generate a vibration, the vibration comprising a component of a first standing wave and a component of a second standing wave simultaneously with a predetermined time phase difference, the first standing wave and the second standing wave being different in terms of an order and having multiple nodal lines which extend in a first direction and are aligned along a second direction,
wherein the second direction crosses the first direction,
wherein the first electrode and the second electrode are aligned along the second direction with a gap,
wherein a first nodal line of the multiple nodal lines is between the first electrode and the second electrode, and
wherein the second electrode is between the first nodal line and a second nodal line which is adjacent to the first nodal line of the multiple nodal lines.

30. The vibrating device according to claim 29, wherein the first electromechanical energy converting element comprises a third electrode and a fourth electrode aligned in the first direction with a gap.

31. The vibrating device according to claim 29, further comprising
a circuit which supplies an alternating voltage to the first electromechanical energy converting element.

32. A drive device comprising the vibrating device according to claim 29, wherein the drive device drives an object in a predetermined direction by using the vibrating device.

33. A dust removing device comprising the vibrating device according to claim 29, wherein the dust removing device moves dust in a predetermined direction by using the vibrating device.

34. An optical device comprising the dust removing device according to claim 29, wherein the optical device removes dust on an optical path by using the dust removing device.

35. The vibrating device according to claim 29, wherein the first electromechanical energy converting element extends in the first direction.

36. The vibrating device according to claim 29, further comprising a second electromechanical energy converting element includes a third electrode and a fourth electrode aligned in the second direction with a gap.

37. The vibrating device according to claim 36, wherein the second electromechanical energy converting element extends in the second direction.

38. The vibrating device according to claim 29, wherein the circuit sets a frequency of the alternating voltage to a frequency that shows a response to both the first standing wave and the second standing wave.

39. The vibrating device according to claim 29, wherein the vibration is a traveling wave.

* * * * *